2 Sheets—Sheet 1.

C. H. WIGHT.

STATIONERY FURNITURE.

No. 4,034. Reissued June 14, 1870.

Witnesses
John A. Ellis
Henry A. Miller

Inventor
Chas H. Wight
Per
T. H. Alexander
Atty.

THE NORRIS PETERS CO., PHOTO-LITHO., WASHINGTON, D. C.

2 Sheets—Sheet 2.

C. H. WIGHT.

STATIONERY FURNITURE.

No. 4,034. Reissued June 14, 1870.

Witnesses:

Jno. A. Ellis

Henry W. Miller.

Inventor:

Chas. H. Wight.

for

T. H. Alexander

Atty.

THE NORRIS PETERS CO., PHOTO-LITHO., WASHINGTON, D. C.

United States Patent Office.

CHARLES H. WIGHT, OF BALTIMORE, MARYLAND.

*Letters Patent No.* 98,453, *dated December* 28, 1869; *reissue No.* 4,034, *dated June* 14, 1870.

IMPROVEMENT IN STATIONERY FURNITURE.

The Schedule referred to in these Letters Patent and making part of the same.

*To all whom it may concern:*

Be it known that I, CHARLES H. WIGHT, of Baltimore, in the county of Baltimore and State of Maryland, have invented certain new and useful Improvements in Stationery Furniture; and I do hereby declare that the following is a full, clear, and exact description thereof, reference being had to the accompanying drawing and to the letters of reference marked thereon, which form a part of this specification.

The nature of my invention consists in the peculiar construction of the stand or frame, whereby I am enabled to arrange, in a convenient manner, the several devices hereinafter described.

In order to enable others skilled in the art to which my invention appertains to make and use the same, I will now proceed to describe its construction and operation, referring to the annexed drawing, in which—

Figure 1:
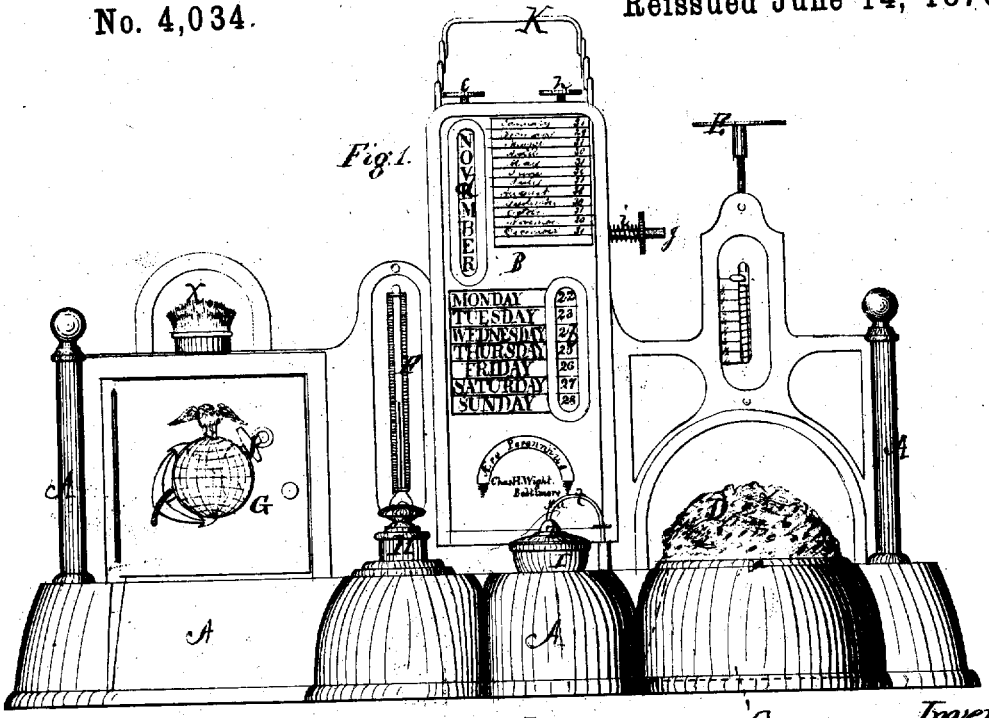

Figure 1 is a front view, and

Figure 2:
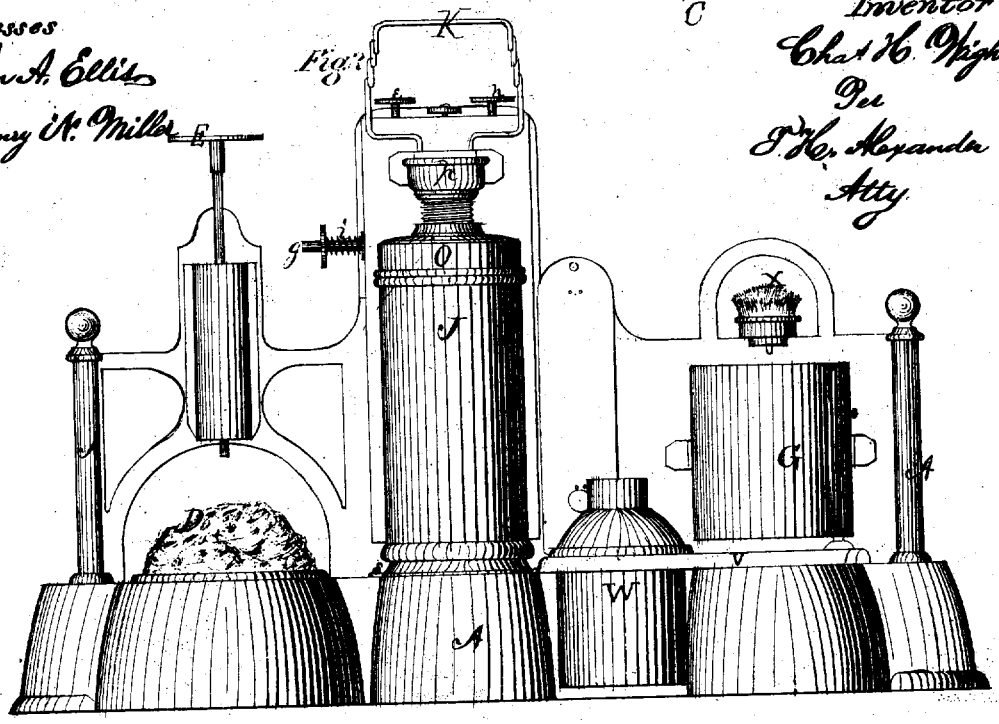
Figure 3:
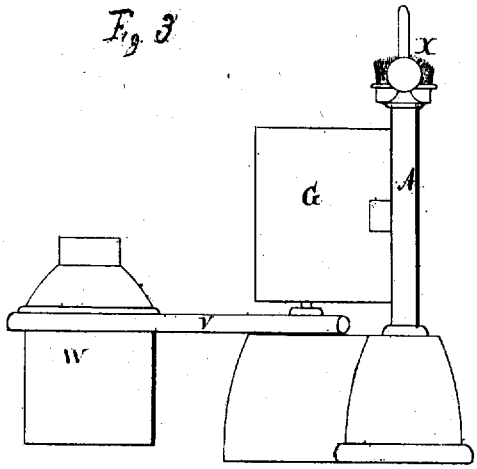

Figure 2 a rear elevation of my entire desk-appointment;

Figure 3 is an end view, showing more fully the swinging mucilage-bottle, and

Figure 4:
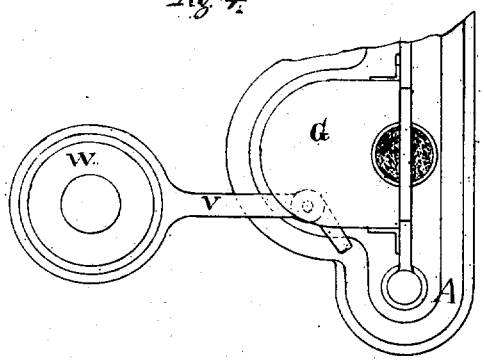

Figure 4 a plan of the same parts.

A represents the stand or frame of my appointment, in the center of which is the calendar B, having on one side a cup, C, in which a sponge, D, is placed, said sponge being secured by a pin, *a*, that passes through the sponge and cup.

Above the sponge-cup C is placed a letter-balance, E, made in any of the known and usual ways.

On the other side of the calendar B is a thermometer, F, and a miniature safe, G, forming a convenient receptacle for postage or other stamps.

What I have called the stand or frame, A, is, in reality, a bed-piece, from which rises a frame the entire length of the bed-piece, and which frame is made with suitable apertures or places to contain all the devices above mentioned, arranged so as to present a neat and tasty appearance.

In the center of the stand A, in front of the calendar and thermometer, are two apertures for the reception of the red-ink bottle H and writing-ink bottle, I, which latter is supplied from the fountain J, placed in the rear of and hid by the calendar B.

On top of the calendar B is the pen-rack K, extending toward the rear. This pen-rack is made of wire, bent in the proper shape, and its ends inserted in loops, or other suitable holders, on the rear side of the calendar-box, so that the rack proper extends above and in rear of the calendar.

Between the safe G and the bed of the stand A is pivoted a bent bar, V, one end of which forms a ring or loop, in which is placed a mucilage-bottle, W, and the other end forms a handle for moving the same. When not in use, the mucilage-bottle W is entirely hid from view, its place being between the safe G and the fountain J, as seen in fig. 2; but when wanted for use, the bar V is readily turned on its pivot, so as to bring the bottle to the side of the safe.

Having thus fully described my invention,

What I claim as new, and desire to secure by Letters Patent, is—

1. The mucilage-bottle W, so arranged upon frame or stand A that it can be swung in or out of view, substantially as described.

2. The arrangement upon stand A of letter-scale E, sponge-cup C, pen-rack K, thermometer F, calendar B, swinging mucilage-bottle W, stamp-safe G, and ink-stand, substantially as and for the purpose set forth.

In testimony that I claim the foregoing as my own, I affix my signature in presence of two witnesses.

CHARLES H. WIGHT.

Witnesses:

EDM. F. BROWN,

JNO. A. ELLIS.